US012222117B2

(12) United States Patent
Delgoshaei et al.

(10) Patent No.: US 12,222,117 B2
(45) Date of Patent: Feb. 11, 2025

(54) SOUND-BASED MOTOR DIAGNOSTICS FOR A CONDENSING UNIT

(71) Applicant: Lennox Industries Inc., Richardson, TX (US)

(72) Inventors: Payam Delgoshaei, Addison, TX (US); Ian Burmania, Rockwall, TX (US); Fnu Aishwarya Mukunda, Dublin, CA (US)

(73) Assignee: Lennox Industries Inc., Richardson, TX (US)

( * ) Notice: Subject to any disclaimer, the term of this patent is extended or adjusted under 35 U.S.C. 154(b) by 289 days.

(21) Appl. No.: 17/935,827

(22) Filed: Sep. 27, 2022

(65) Prior Publication Data

US 2024/0102676 A1 Mar. 28, 2024

(51) Int. Cl.
*F24F 11/38* (2018.01)
*H04R 1/08* (2006.01)
*H04R 3/00* (2006.01)

(52) U.S. Cl.
CPC ................ *F24F 11/38* (2018.01); *H04R 1/08* (2013.01); *H04R 3/00* (2013.01)

(58) Field of Classification Search
CPC ............... F24F 11/38; H04R 1/08; H04R 3/00
See application file for complete search history.

(56) References Cited

U.S. PATENT DOCUMENTS

2017/0068233 A1* 3/2017 Park ........................ H02P 31/00
2020/0240662 A1* 7/2020 Picardi ..................... F24F 11/37
2021/0302063 A1* 9/2021 McCune ................. F24F 13/24
2022/0295176 A1* 9/2022 Eswara ............ G08B 13/19645

* cited by examiner

*Primary Examiner* — Henry T Crenshaw
(74) *Attorney, Agent, or Firm* — Baker Botts L.L.P.

(57) ABSTRACT

An analysis device is configured to operate a heating, ventilation, and air conditioning (HVAC) system and to receive an audio signal from a sound sensor, wherein the audio signal is associated with a condensing unit of the HVAC system. The device is configured to determine an audio signature from the audio signal and to determine whether a motor of the condensing unit is operating within a mode of operation based on the audio signature. The device is further configured to determine a fault type that is associated with the audio signature and to output a recommendation based on the determined fault type.

20 Claims, 5 Drawing Sheets

SOUND-BASED MOTOR DIAGNOSTICS FOR A CONDENSING UNIT

TECHNICAL FIELD

The present disclosure relates generally to heating, ventilation, and air conditioning (HVAC) system control, and more specifically to sound-based motor diagnostics for a condensing unit.

BACKGROUND

Existing heating, ventilation, and air conditioning (HVAC) systems typically can only provide a general alert when there is an issue with an HVAC system. For example, the HVAC system may report that an error has occurred while trying to operate the HVAC system and that a service is required to repair the HVAC system. Existing HVAC systems cannot typically self-diagnose any issues with the HVAC system. This means that a technician will need to inspect the HVAC system and make repairs to the HVAC system. In many instances, a technician will need to make multiple trips to a location to first diagnose the issue with an HVAC system and then to return with the appropriate parts and tools for servicing the HVAC system. This process results in an extended amount of downtime while the technician diagnoses and makes repairs to the HVAC system.

SUMMARY

The system disclosed in the present application provides a technical solution to the technical problems discussed above by providing a sound-based HVAC diagnostic system that is configured to detect faults and issues within a condensing unit of an HVAC system based on sounds made by the components of the condensing unit (i.e., the motor). The disclosed system provides several practical applications and technical advantages which include a process that enables an HVAC system to self-diagnose faults within the condensing unit and to output information that identifies faulty components of the condensing unit and/or instructions for servicing the condensing unit. These features reduce the amount of downtime that an HVAC system will experience because the HVAC system is able to output information that identifies the components that are causing the issues that the condensing unit is experiencing. This process allows a technician to be prepared with all of the necessary equipment (i.e. parts and tools) and instructions for servicing the condensing unit without having to first diagnose the condensing unit themselves.

In addition, existing HVAC systems rely on a manual inspection for diagnosing issues and faulty components. Such a manual process is susceptible to misdiagnosing issues or overlooking some faulty components that may need replacing or servicing. The HVAC system may experience additional downtime when an HVAC system is misdiagnosed and/or not all of the correct components are serviced. In contrast, the self-diagnosing feature of the disclosed HVAC system ensures that the condensing unit will be correctly diagnosed and serviced at the outset which prevents further downtime for the HVAC system.

In one embodiment, the system comprises a cooling unit configured to receive an airflow and to transfer heat from the received airflow to a flow of refrigerant. The system further comprises a condensing unit configured to reject heat from the flow of refrigerant, wherein the condensing unit comprises a fan and a motor. The system further comprises a sound sensor configured to capture an audio signal of the condensing unit and an analysis device operably coupled to the sound sensor. The analysis device comprises a memory operable to store an audio signature library comprising a plurality of audio signatures, wherein each audio signature identifies one or more attributes for a portion of an audio signal, and wherein each audio signature is associated with a fault type for the motor associated with the fan of the condensing unit. The analysis device further comprises a processor operably coupled to the memory. The processor is configured to determine that there is a demand to operate the fan within the condensing unit of the HVAC system. The processor is further configured to receive a first audio signal from the sound sensor associated with the condensing unit and to determine an audio signature of the received first audio signal. The processor is further configured to determine that the motor is not in a first mode of operation based on the determined audio signature and to determine whether a second audio signal is received from the sound sensor. In response to determining that the sound sensor received the second audio signal, the processor is configured to determine the fault type for the motor based on the determination of the audio signature present within the first audio signal and to output a recommendation based on the determined fault type.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
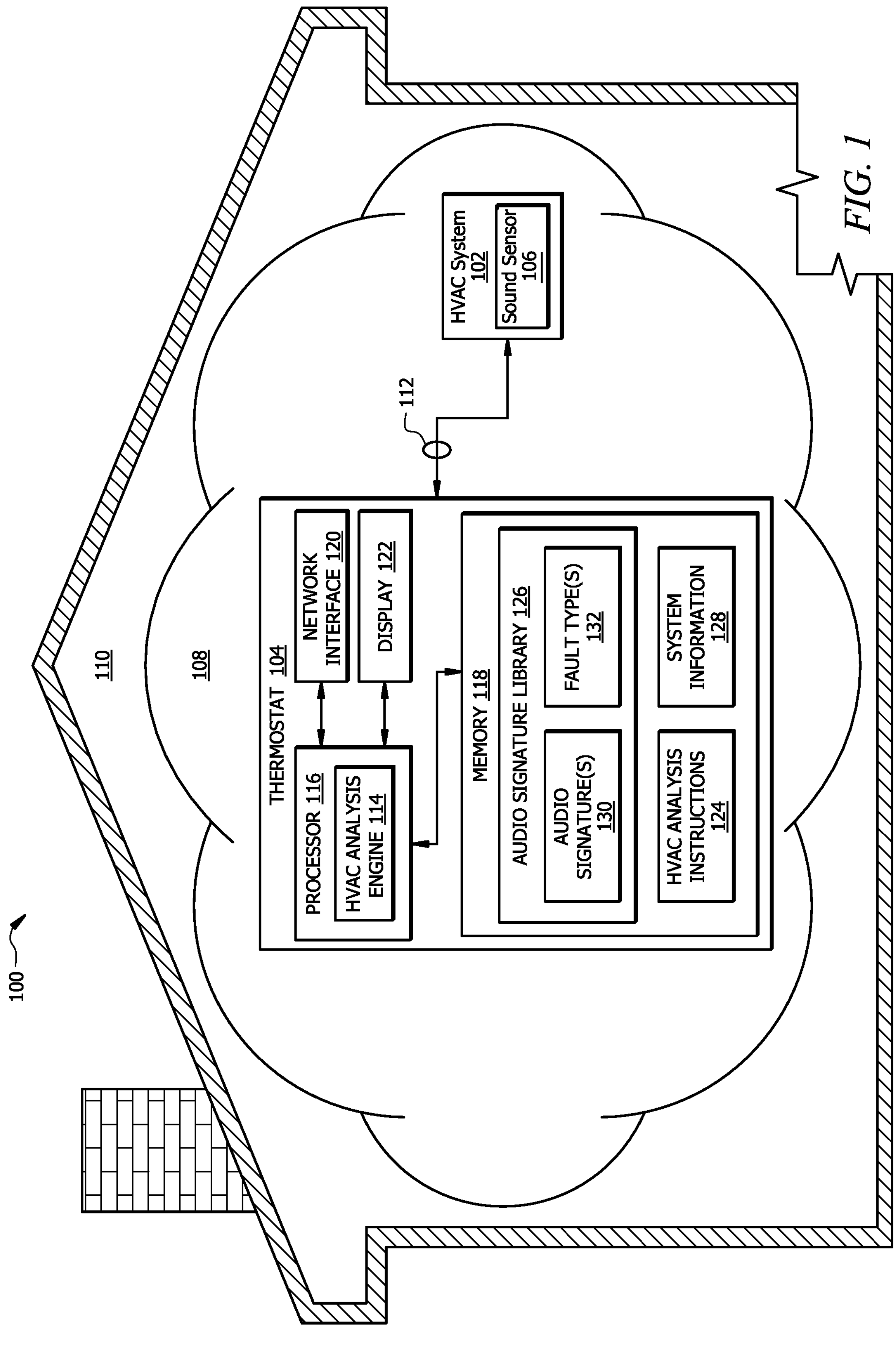
FIG. 1 is a schematic diagram of an embodiment of an analysis system for an HVAC system.

FIG. 1 is a schematic diagram of an embodiment of an analysis system 100 for heating, ventilation, and air conditioning (HVAC) systems 102. The analysis system 100 is generally configured to use sound for detecting and diagnosing faults within an HVAC system 102. More specifically, the analysis system 100 may be configured to self-diagnose faults within the HVAC system 102 and to output information that identifies any faulty components of the HVAC system 102 and/or instructions for servicing the HVAC system 102. These features may reduce the amount of downtime that an HVAC system 102 will experience because the HVAC system 102 is able to output information about the components that are causing the issues that the HVAC system 102 is experiencing. This process may allow a technician to be prepared with all of the necessary equipment (i.e. parts and tools) and instructions for servicing the HVAC system 102 without having to first diagnose the HVAC system 102.

In one embodiment, the analysis system 100 comprises a thermostat 104, a sound sensor 106, and the HVAC system 102 that are in signal communication with each other over a network 108. The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

The HVAC system 102 is generally configured to control the temperature of a space 110. Examples of a space 110 may include, but are not limited to, a room, a home, an apartment, a mall, an office, a warehouse, or a building. The HVAC system 102 may comprise the thermostat 104, compressors, blowers, evaporators, condensers, and/or any other suitable type of hardware for controlling the temperature of the space 110. An example of an HVAC system 102 configuration and its components are described in more detail below in FIG. 2. Although FIG. 1 illustrates a single HVAC system 102, a location or space 110 may comprise a plurality of HVAC systems 102 that are configured to work together. For example, a large building may comprise multiple HVAC systems 102 that work cooperatively to control the temperature within the building.

The analysis system 100 may comprise one or more sound sensors 106. The sound sensors 106 may be positioned at various locations within the HVAC system 102. The sound sensors 106 are generally configured to record the sounds that are made by electrical and mechanical components of the HVAC system 102. For example, a sound sensor 106 may be positioned proximate or adjacent to a condensing unit, a cooling unit, or any other component of the HVAC system 102. Each sound sensor 106 may be configured to capture audio signals 112 of one or more components of the HVAC system 102. A sound sensor 106 may be configured to capture audio signals 112 continuously, at predetermined intervals, or on-demand. Each sound sensor 106 is operably coupled to a HVAC analysis engine 114 of the thermostat 104 and provides captured audio signals 112 to the HVAC analysis engine 114 for processing.

Thermostat

An analysis device, such as thermostat 104, is generally configured to collect sound information for various components of the HVAC system 102 while operating the HVAC system 102 and to diagnosis faults within the HVAC system 102 based on the sound information. An example of the thermostat 104 in operation is described below in FIG. 3. As an example, the thermostat 104 may comprise a processor 116, a memory 118, and a network interface 120. The thermostat 104 may further comprise a graphical user interface, a display 122, a touch screen, buttons, knobs, or any other suitable combination of components. The thermostat 104 may be configured as shown or in any other suitable configuration.

The processor 116 comprises one or more processors operably coupled to the memory 118. The processor 116 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 116 may be a programmable logic device, a microcontroller, a microprocessor, or any suitable combination of the preceding. The processor 116 is communicatively coupled to and in signal communication with the memory 118, display 122, sound sensors 106, and the network interface 120. The one or more processors may be configured to process data and may be implemented in hardware or software. For example, the processor 116 may be 8-bit, 16-bit, 32-bit, 64-bit, or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute HVAC analysis instructions 124 to implement the HVAC analysis engine 114. The HVAC analysis instructions 124 may comprise any suitable set of instructions, logic, rules, or code operable to execute the HVAC analysis engine 114. In this way, processor 116 may be a special-purpose computer designed to implement the functions disclosed herein. In an embodiment, the HVAC analysis engine 114 is implemented using logic units, FPGAs, ASICs, DSPs, or any other suitable hardware. The HVAC analysis engine 114 is configured to operate as described in FIGS. 1 and 3. For example, the HVAC analysis engine 114 may be configured to perform the steps of process 300 as described in FIG. 3. The HVAC analysis engine 114 is generally configured to control the operation of the HVAC system 102, to receive audio signals 112 from one or more sound sensors 106 of the components of the HVAC system 102 while the HVAC system 102 operates, and to detect and diagnose faults within the HVAC system 102 based on the audio signals 112. In some embodiments, the HVAC analysis engine 114 may employ hardware resources from a remote or cloud server to process the audio signals 112 to detect and diagnose faults within the HVAC system 102.

Figure 3:
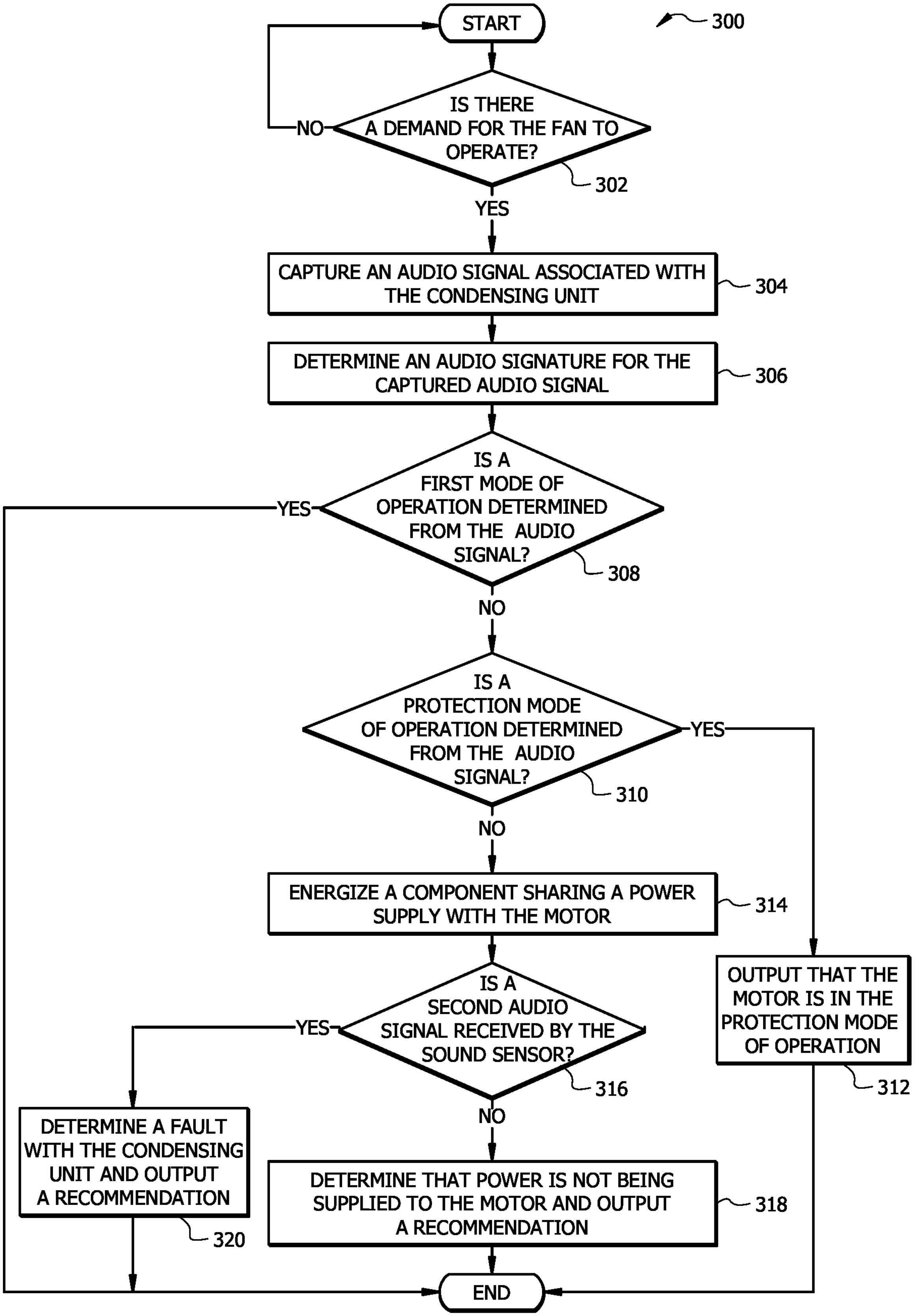
FIG. 3 is a flowchart of an embodiment of an analysis process for an HVAC system.

The memory 118 is operable to store any of the information described with respect to FIGS. 1 and 3 along with any other data, instructions, logic, rules, or code operable to implement the function(s) described herein when executed by the processor 116. The memory 118 comprises one or more disks, tape drives, or solid-state drives, and may be used as an over-flow data storage device, to store programs when such programs are selected for execution, and to store instructions and data that are read during program execution. The memory 118 may be volatile or non-volatile and may comprise a read-only memory (ROM), random-access memory (RAM), ternary content-addressable memory (TCAM), dynamic random-access memory (DRAM), and static random-access memory (SRAM).

The memory 118 is operable to store HVAC analysis instructions 124, an audio signature library 126, system information 128, and/or any other data or instructions. The audio signature library 126 may comprise information that can be used with a visual representation (e.g. a plot or graph) of an audio signal 112 to determine whether a fault is present. For example, the audio signature library 126 may be configured to associate audio signatures 130 with fault types 132. An audio signature 130 may identify attributes of an audio signal 112 that can be used to determine whether a fault is present within the HVAC system 102. Examples of audio signatures 130 include, but are not limited to, waveform profiles or patterns, frequency profiles or patterns, threshold values, or any other suitable type of information that can be used with a plot of an audio signal 112 to determine whether a fault is present. The fault type 132 may identify a particular type of issue that the HVAC is experiencing in association with a condensing unit. In embodiments, the fault type 132 may be associated with motor performance of a condensing unit of the HVAC system 102. Examples of fault types 132 include, but are not limited to, motor faults, motor mounting hardware faults, fan faults, or any other suitable type of fault associated with the condensing unit. For example, motor faults may include bearing failure or a determination that the motor is operating in a protection mode. Motor mounting hardware faults may include a damaged weld, an unsecured fastener, or a loose belly band. Fan faults may include free spinning wherein the fan blade has decoupled from the motor, loose set screw, or a damaged fan blade.

The system information 128 may comprise information that is associated with the condensing unit of the HVAC system 102, such as information associated with a fan, a motor, mounting hardware for the motor, and any other suitable components within the condensing unit. The system information 128 may comprise instructions for condensing unit, information about tools required for servicing the condensing unit, information about the physical locations of the components of the condensing unit, technical specifications for the condensing unit, and/or any other suitable type of information that is associated with the condensing unit.

The display 122 is a graphical user interface that is configured to present visual information to a user using graphical objects. Examples of the display 122 include, but are not limited to, a liquid crystal display (LCD), a liquid crystal on silicon (LCOS) display, a light-emitting diode (LED) display, an active-matrix OLED (AMOLED), an organic LED (OLED) display, a projector display, or any other suitable type of display as would be appreciated by one of ordinary skill in the art.

The network interface 120 is configured to enable wired and/or wireless communications. The network interface 120 is configured to communicate data between the thermostat 104 and other devices (e.g. sound sensors 106 and the HVAC system 102), systems, or domains. For example, the network interface 120 may comprise an NFC interface, a Bluetooth interface, a Zigbee interface, a Z-wave interface, an RFID interface, a WIFI interface, a LAN interface, a WAN interface, a PAN interface, a modem, a switch, or a router. The processor 116 may be configured to send and receive data using the network interface 120. The network interface 120 may be configured to use any suitable type of communication protocol as would be appreciated by one of ordinary skill in the art.

HVAC System Configuration

Figure 2:
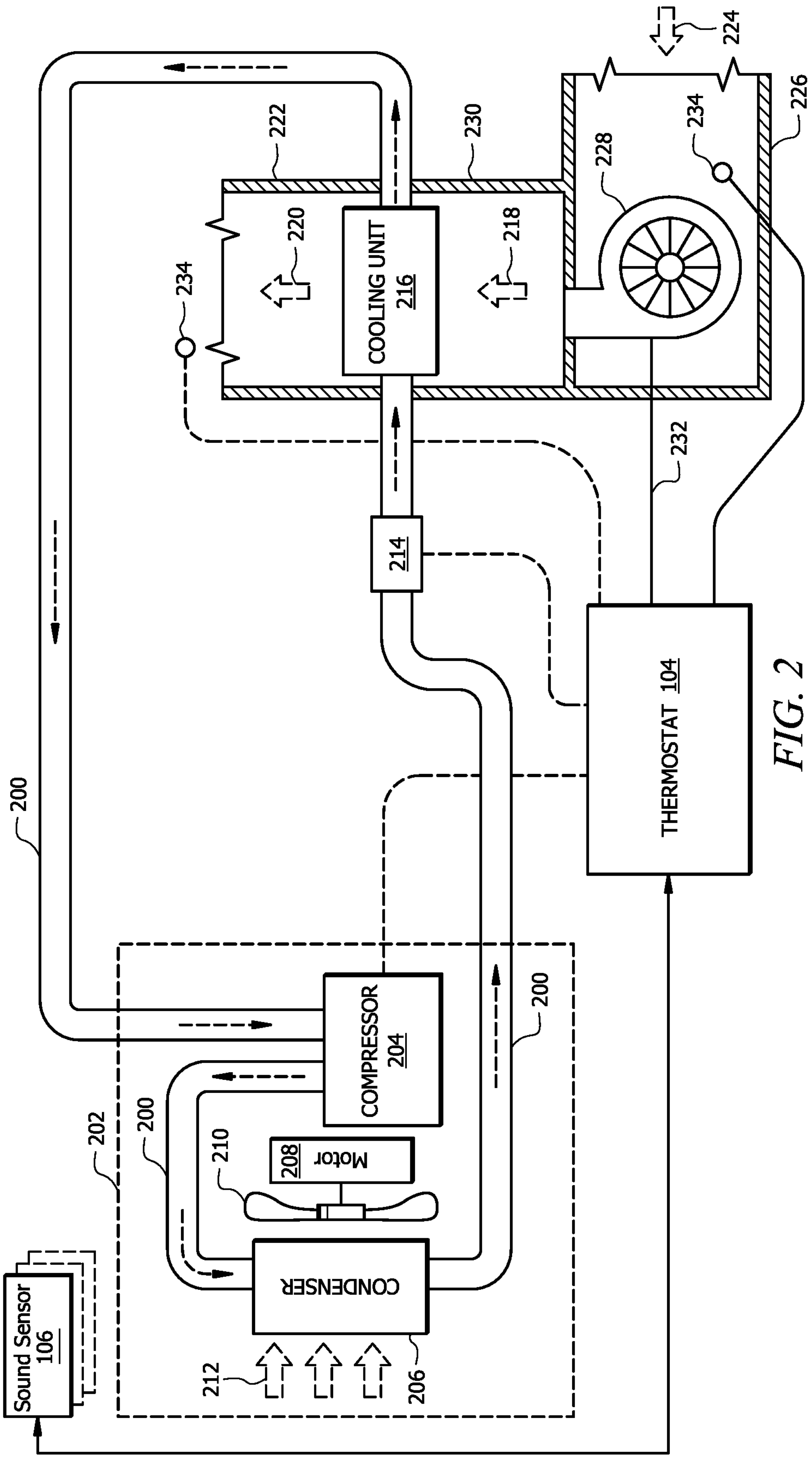
FIG. 2 is a schematic diagram of an embodiment of an HVAC system configured to integrate with the analysis system of FIG. 1.

FIG. 2 is a schematic diagram of an embodiment of an HVAC system 102 configured to integrate with an analysis system 100. The HVAC system 102 conditions air for delivery to an interior space of a building or home. In some embodiments, the HVAC system 102 may be a rooftop unit (RTU) that is positioned on the roof of a building and the conditioned air is delivered to the interior of the building. In other embodiments, portions of the system may be located within the building and a portion outside the building. The HVAC system 102 may also include heating elements that are not shown here for convenience and clarity. The HVAC system 102 may be configured as shown in FIG. 2 or in any other suitable configuration. For example, the HVAC system 102 may include additional components or may omit one or more components shown in FIG. 2.

The HVAC system 102 comprises a working-fluid conduit subsystem 200 for moving a working fluid, or refrigerant, through a cooling cycle. The working fluid may be any acceptable working fluid, or refrigerant, including, but not limited to, fluorocarbons (e.g. chlorofluorocarbons), ammonia, non-halogenated hydrocarbons (e.g. propane), hydrofluorocarbons (e.g. R-410A), or any other suitable type of refrigerant.

The HVAC system 102 comprises one or more condensing units 202. In one embodiment, the condensing unit 202 comprises a compressor 204, a condenser coil 206, a motor 208, and a fan 210. The compressor 204 is coupled to the working-fluid conduit subsystem 200 that compresses the working fluid. The condensing unit 202 may be configured with a single-stage or multi-stage compressor 204 or with multiple compressors. In the configuration of one or more compressors, the one or more compressors can be turned on or off to adjust the cooling capacity of the HVAC system 102. In some embodiments, a compressor 204 may be configured to operate at multiple speeds or as a variable speed compressor. For example, the compressor 204 may be configured to operate at multiple predetermined speeds.

In one embodiment, the condensing unit 202 (e.g. the compressor 204) is in signal communication with a controller or thermostat 104 using a wired or wireless connection. The thermostat 104 is configured to provide commands or signals to control the operation of the compressor 204. For example, the thermostat 104 is configured to send signals to turn on or off one or more compressors 204 when the condensing unit 202 comprises multiple compressors 204. In this configuration, the thermostat 104 may operate the compressors 204 in a first mode where all the compressors 204 are on and a second mode where at least one of the compressors 204 is off. In some examples, the thermostat 104 may be configured to control the speed of the compressor 204.

The condenser 206 is configured to assist with moving the working fluid through the working-fluid conduit subsystem 200. The condenser 206 is located downstream of the compressor 204 for rejecting heat. The fan 210 is configured to move air 212 across the condenser 206. For example, the fan 210 may be configured to blow outside air through the heat exchanger to help cool the working fluid. As illustrated, the fan 210 may be coupled to the motor 208, wherein the motor 208 may be configured to actuate the fan 210. The motor 208 may generally be configured to control the operation of any suitable component of HVAC system 102.

Examples of motor 208 may include, but are not limited to, a direct current (DC) motor, an alternating current (AC) motor, or any other suitable type of electrical motor. For example, a motor 208 may be a DC motor that comprises a stator magnet, an armature conductor, a commutator, brushes, a winding, and/or any other suitable combination of components as would be appreciated by one of ordinary skill in the art. The motor 208 is configured to provide a rotational force in response to receiving an electrical signal, for example, a current signal or a voltage signal. For example, motor 208 may be configured to rotate an impeller, fan blades, a pump, or any other suitable type of component. The motor 208 may be a ½-horsepower motor, a ¾-horsepower motor, a 1-horsepower motor, or any other suitable size electric motor. In one or more embodiments, the motor 208 may be configured to drive the fan 210 of the condensing unit 202.

As illustrated, sound sensor 106 may be disposed in proximity to the condensing unit 202 and configured to capture audio signals 112 (referring to FIG. 1) generated by the condensing unit 202. Sound sensor 106 may be disposed on top of, to a side of, or coupled to the condensing unit 202. In embodiments, the sound sensor 106 may be configured to capture audio signals 122 generated at least by the motor 208, wherein the audio signals 112 may be analyzed to perform diagnostics associated with the motor 208. In one or more embodiments, there may be a plurality of condensing units 202, wherein the sound sensor 106 may be configured to capture audio signals 112 generated by at least a portion of the plurality of condensing units 202.

With reference back to the flow of the working fluid, the compressed, cooled working fluid flows downstream from the condenser 206 to an expansion device 214, or a metering device. The expansion device 214 is configured to remove pressure from the working fluid. The expansion device 214 is coupled to the working-fluid conduit subsystem 200 downstream of the condenser 206. The expansion device 214 is closely associated with a cooling unit 216 (e.g. an evaporator coil). The expansion device 214 is coupled to the working-fluid conduit subsystem 200 downstream of the condenser 206 for removing pressure from the working fluid. In this way, the working fluid is delivered to the cooling unit 216 and receives heat from airflow 218 to produce a treated airflow 220 that is delivered by a duct subsystem 222 to the desired space, for example, a room in the building.

A portion of the HVAC system 102 is configured to move air across the cooling unit 216 and out of the duct subsystem 222. Return air 224, which may be air returning from the building, fresh air from outside, or some combination, is pulled into a return duct 226. A suction side of a variable-speed blower 228 pulls the return air 224. The variable-speed blower 228 discharges airflow 218 into a duct 230 from where the airflow 218 crosses the cooling unit 216 or heating elements (not shown) to produce the treated airflow 220.

Examples of a variable-speed blower 228 include, but are not limited to, belt-drive blowers controlled by inverters, direct-drive blowers with electronically commutated motors (ECM), or any other suitable types of blowers. In some configurations, the variable-speed blower 228 is configured to operate at multiple predetermined fan speeds. In other configurations, the fan speed of the variable-speed blower 228 can vary dynamically based on a corresponding temperature value instead of relying on using predetermined fan speeds. In other words, the variable-speed blower 228 may be configured to dynamically adjust its fan speed over a range of fan speeds rather than using a set of predetermined fan speeds. This feature also allows the thermostat 104 to gradually transition the speed of the variable-speed blower 228 between different operating speeds. This contrasts with conventional configurations where a variable-speed blower 228 is abruptly switched between different predetermined fan speeds. The variable-speed blower 228 is in signal communication with the thermostat 104 using any suitable type of wired or wireless connection 232. The thermostat 104 is configured to provide commands or signals to the variable-speed blower 228 to control the operation of the variable-speed blower 228. For example, the thermostat 104 is configured to send signals to the variable-speed blower 228 to control the fan speed of the variable-speed blower 228. In some embodiments, the thermostat 104 may be configured to send other commands or signals to the variable-speed blower 228 to control any other functionality of the variable-speed blower 228.

The HVAC system 102 comprises one or more sensors 234 in signal communication with the thermostat 104. The sensors 234 may comprise any suitable type of sensor for measuring the air temperature. The sensors 234 may be positioned anywhere within a conditioned space (e.g. a room or building) and/or the HVAC system 102. For example, the HVAC system 102 may comprise a sensor 234 positioned and configured to measure an outdoor air temperature. As another example, the HVAC system 102 may comprise a sensor 234 positioned and configured to measure a supply or treated air temperature and/or a return air temperature. In other examples, the HVAC system 102 may comprise sensors 234 positioned and configured to measure any other suitable type of air temperature, pressure, humidity, or any other suitable parameter.

The HVAC system 102 may comprise one or more thermostats 102, for example, located within a conditioned space (e.g. a room or building). The thermostat 104 may be a single-stage thermostat, a multi-stage thermostat, or any suitable type of thermostat as would be appreciated by one of ordinary skill in the art. The thermostat 104 may be configured to allow a user to input a desired temperature or temperature set point for a designated space or zone such as the room.

Analysis Process for an HVAC System

FIG. 3 is a flowchart of an embodiment of an analysis process 300 for an HVAC system 102. The analysis system 100 may employ process 300 to detect and diagnose faults within the condensing unit 202 (referring to FIG. 2) while operating the HVAC system 102. The diagnosed faults may be associated with performance of the motor 208 (referring to FIG. 2), the fan 210 (referring to FIG. 2), and/or mounting hardware. Process 300 enables the analysis system 100 to self-diagnose faults within condensing unit 202 and to output information that identifies any faulty components of condensing unit 202 (such as fan 210, motor 208, and/or mounting hardware) and/or instructions for servicing the condensing unit 202. This process reduces the amount of downtime that HVAC system 102 will experience because the HVAC system 102 is able to output information about the components that are causing the issues that the condensing unit 202 is experiencing. This process allows a technician to be prepared with all of the necessary equipment (i.e. parts and tools) and instructions for servicing the condensing unit 202 without having to first diagnose the condensing unit 202.

At step 302, the thermostat 104 (referring to FIG. 1) determines whether or not there is a demand for the fan 210 to operate. In an example, the HVAC system 102 may be operating and may require the fan 210 to operate in the condensing unit 202 in order to reject heat. In this example, the thermostat 104 may have previously sent instructions or commands to the actuate the condensing unit 202. The thermostat 104 may verify that the HVAC system 102 prompted a demand from the fan 210 to actuate prior to transmitting an instruction to the motor 208 to operate the fan 210. In embodiments, the thermostat 104 may be any suitable controller or information handling system.

The thermostat 104 may remain at step 302 in response to determining that there is no demand for operation of the fan 210. In this case, the thermostat 104 remains at step 302 to continue checking for a demand for the fan 210 to execute the fault detection and diagnosis process for the condensing unit 202. The process 300 proceeds to step 304 in response to determining that there is a demand for operation of the fan 210.

At step 304, the thermostat 104 may activate one or more sound sensors 106 (referring to FIG. 1). Here, the thermostat 104 activates one or more sound sensors 106 by transitioning the sound sensors 106 from an inactive state to an active state. In the inactive state, the sound sensors 106 are not configured to capture audio signals 112 (referring to FIG. 1) or to send audio signals 112 to the thermostat 104 for processing. In the active state, the sound sensors 106 are configured to capture audio signals 112 and to send audio signals 112 to the thermostat 104 for processing.

Once in the active state, the thermostat 104 may use the sound sensors 106 to capture an audio signal 112 of the components of the condensing unit 202 while the condensing unit 202 is operating or while the condensing unit 202 attempts to execute commands that were provided by the thermostat 104. The thermostat 104 may be configured to capture the audio signal 112 for any suitable duration of time. In some embodiments, the thermostat 104 may combine audio signals from multiple sound sensors 106 that are distributed to form an aggregated audio signal 112.

At step 306, the thermostat 104 may identify one or more audio signatures 130 (referring to FIG. 1) from the audio signature library 126 (referring to FIG. 1) based on the commands that the thermostat 104 used to control the operation of the condensing unit 202. In this example, the thermostat 104 may identify the audio signatures 130 that are associated with the fan 210 (referring to FIG. 2) and motor 208 (referring to FIG. 2) that are used to perform the requested operation from the thermostat 104. As another example, the thermostat 104 may identify audio signatures 130 that are commonly associated with faults of the condensing unit 202 (i.e., motor faults, motor mounting hardware faults, fan faults, etc.). In other examples, the thermostat 104 may use any other suitable criteria for identifying audio signatures 130.

The thermostat 104 may then compare the identified one or more audio signatures 130 to the captured audio signal 112 from step 304. The thermostat 104 may compare the attributes of each audio signature 130 to at least a portion of the captured audio signal 112 to determine whether any one of the identified one or more audio signatures 130 is present within the captured audio signal 112.

In an example, the thermostat 104 may generate a plot of the captured audio signal 112 for comparison to the identified one or more audio signatures 130. The thermostat 104 may generate any suitable type of graphical or visual representation of the audio signal 112 that can be used for detecting and diagnosing faults within the condensing unit 202. Referring to the example shown in FIGS. 4A-4C, the thermostat 104 may generate plots of amplitudes for the audio signal 112 over time. In these examples, the audio signal 112 includes audio samples for operation of the motor 208.

Figure 4A:
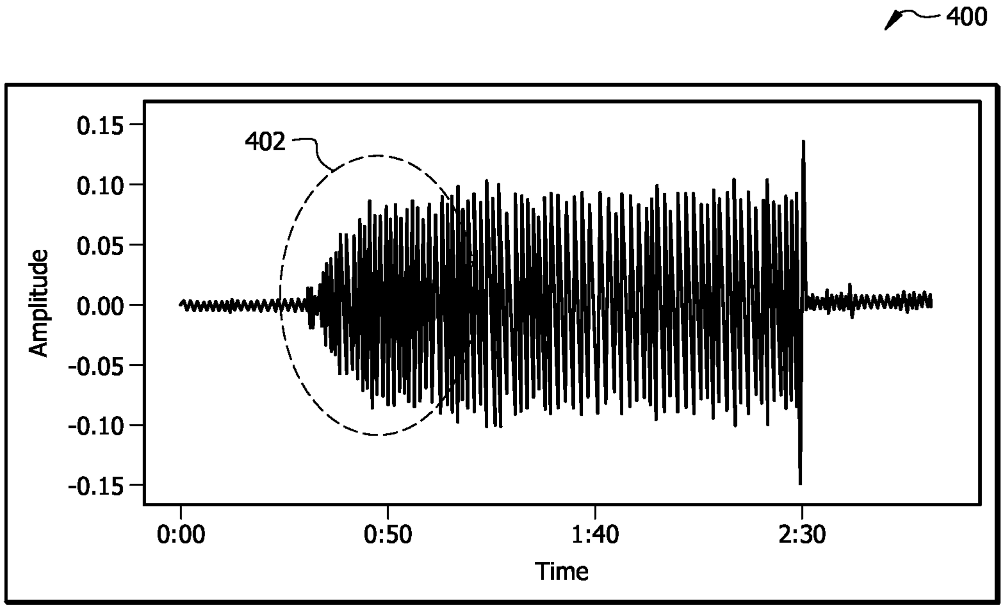
FIG. 4A is an example of a plot of an audio signal.

Referring to the example shown in FIG. 4A, the thermostat 104 may generate a plot 400 of amplitude for the audio signal 112 over time. In this example, the plot 400 may generally depict normal operation of the motor 208. Plot 400 may comprise an audio signature 402 for the audio signal 112 indicating the normal operation of the motor 208. For example, normal operation of the motor 208 may comprise of an initial period of ramping up, wherein the amplitude of the sound the motor 208 produces increases. The normal operation of the motor 208 may further comprise a subsequent period of constant amplitude followed by a sudden reduction in amplitude approximating to zero when the motor 208 is turned off.

Figure 4B:
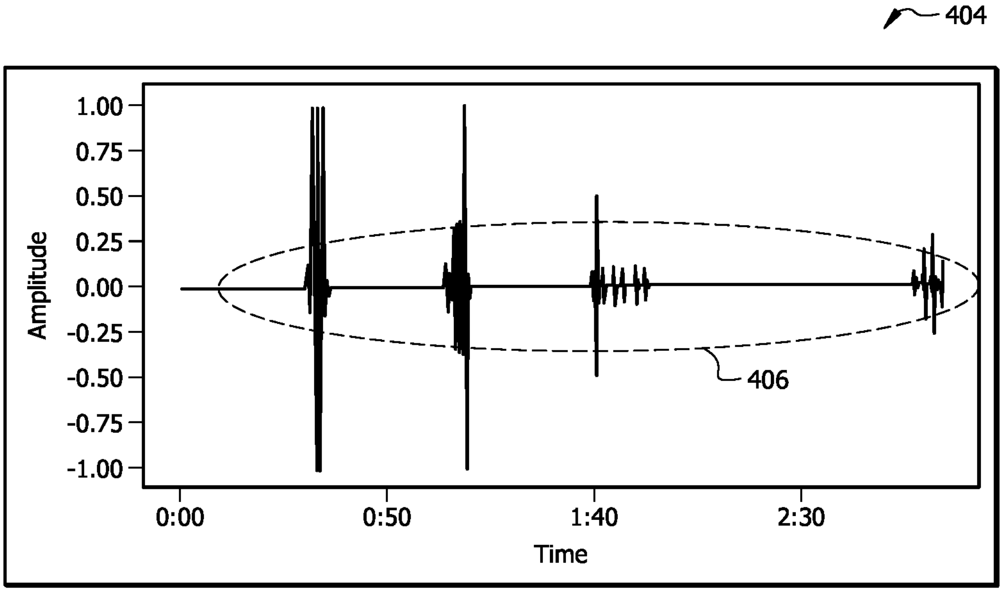
FIG. 4B is another example of a plot of an audio signal.

With reference to FIG. 4B, the thermostat 104 may generate another plot 404 of amplitude for the audio signal 112 over time. In this example, the plot 404 may generally depict the motor 208 operating in a protection mode. Plot 404 may comprise an audio signature 406 for the audio signal 112 indicating the protection mode of operation for the motor 208. In embodiments, there may be a plurality of protection modes of operation. For example, a reset and restart mode may be a protection mode of operation wherein the motor 208 repeatedly attempts to start operating for a predetermined number of attempts. Without limitations, other protection modes of operation may include locked rotor, overcurrent, or overheat. As depicted, audio signature 406 comprises four distinct, brief periods of time wherein the amplitude of the sound the motor 208 produces spikes.

Figure 4C:
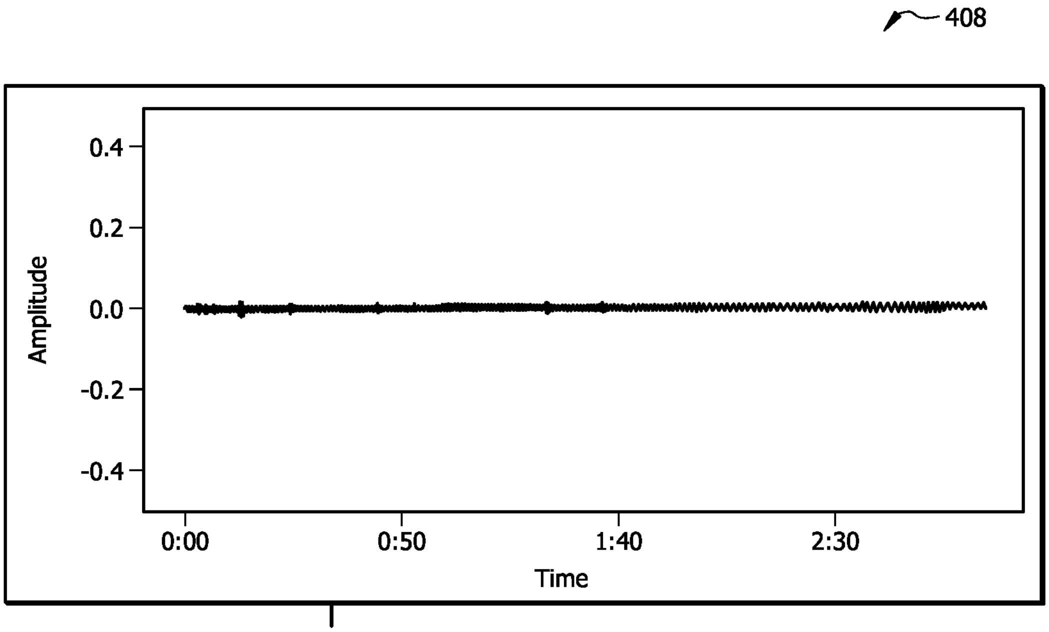
FIG. 4C is another example of a plot of an audio signal.

With reference now to FIG. 4C, the thermostat 104 may generate another plot 408 of amplitude for the audio signal 112 over time. In this example, the plot 408 may generally depict the motor 208 turned off or not operating. Plot 408 may not comprise any audio signatures associated with an audio signal 112. In embodiments, there may be no sound detected by the sound sensors 106. As such, the audio signal 112 may generally comprise an amplitude approximating zero.

Referring back to process 300 in FIG. 3, the thermostat 104 may determine if any portion of the audio signal 112 matches an identified one or more audio signatures 130 associated with the condensing unit 202. Once an audio signature is determined from the audio signal 112, the process 300 proceeds to step 308.

At step 308, the thermostat 104 may determine whether the motor 208 is operating in a first mode of operation. In an example, the first mode of operation may be a normal mode of operation, as best described in FIG. 4A. The thermostat 104 may determine if the audio signal 112 captured in step 304 comprises an audio signature 130 indicating operation of the motor 208 in the first mode of operation. The thermostat 104 may compare the captured audio signal 112 to the audio signature 130 stored in the memory 118 (referring to FIG. 1) associated with normal operation of the motor 208 to make this determination. If the thermostat 104 determines that the motor 208 is operating in a first mode of operation, the process 300 proceeds to end. Otherwise, the process 300 proceeds to 310.

At step 310, the thermostat 104 may determine whether the motor 208 is operating in a protection mode of operation (as best described in FIG. 4B). Similar to step 308, the thermostat 104 may determine if the audio signal 112 captured in step 304 comprises an audio signature 130 indicating operation of the motor 208 in a protection mode of operation. The thermostat 104 may compare the captured audio signal 112 to one or more audio signatures 130 stored in the memory 118 (referring to FIG. 1) associated with one of a plurality of protection modes of operation of the motor 208 to make this determination. If the thermostat 104 determines that the motor 208 is operating in a protection mode of operation, the process 300 proceeds to step 312. Otherwise, the process 300 proceeds to 314.

At step 312, the thermostat 104 may output that the motor 208 is operating in a protection mode of operation. The thermostat 104 may display the output on the thermostat 104 via the display 122 (referring to FIG. 1). In this example, the thermostat 104 allows a user to identify the operational condition of the motor 208 locally by interacting with the graphical user interface of the thermostat 104. The output may also be accessible from a user device that is configured to communicate with the thermostat 104. For instance, a user may be able to access the output using a mobile application or an Internet browser on a user device.

In another example, the thermostat 104 may transmit a signal to a device that is located external to the HVAC system 102, wherein the signal comprises a recommendation for servicing the motor 208. In this example, the thermostat 104 allows a user to receive the output remotely. For instance, the thermostat 104 may send the output to a user device of a technician that intended to service the condensing unit 202. As the output indicates the motor 208 operating in a protection mode of operation, the technician may need to service the condensing unit 202 in relation to addressing the reason the motor 208 is operating in the protection mode. The process 300 then proceeds to end.

At step 314, the thermostat 104 may send a command to energize a component sharing a power supply with the motor 208 of the condensing unit 202. For example, the sound sensor 106 may have previously captured an audio signal 112, but the motor 208 may not be operating to produce a sound configured to be captured by the sound sensor 106 (i.e., the motor 208 may not be operating even though there was a demand for operation of the fan 210). The audio signal 112 may have been produced by a different component. The thermostat 104 may instruct a nearby component of the HVAC system 102, such as a secondary or subsequent condensing unit 202, to operate in order to determine that the motor 208 is connected to the power supply based on reception of another audio signal 112.

At step 316, the thermostat 104 may determine whether the sound sensor 106 received a second audio signal 112 based on operation of a nearby component in relation to the condensing unit 202. For example, the nearby component may produce a sound or noise as it operates. If the thermostat 104 determines that the sound sensor 106 did not receive a second audio signal 112, the process 300 proceeds to step 318. Otherwise, the process 300 proceeds to 320.

At step 318, the thermostat 104 may determine that power is not being supplied to the motor 208 in response to determining that the sound sensor 106 did not receive the second audio signal 112. The thermostat 104 may determine that the nearby component did not operate when previously instructed to by the thermostat 104 because the sound sensor 106 did not receive a second audio signal 112. If the nearby component did not operate, there may be a problem with the power supply. For example, if the nearby component shares a power supply with the motor 208 and the nearby component did not operate when instructed by the thermostat 104, the thermostat 104 may determine that there is a problem with providing power to the motor 208. The thermostat 104 may output that there is a problem with providing power to the motor 208. The thermostat 104 may then display the output on the thermostat 104 via the display 122. The output may also be accessible from a user device that is configured to communicate with the thermostat 104. The thermostat may transmit the output and a recommendation to a user, such as a technician, wherein the recommendation comprises instructions for servicing the condensing unit 202. For example, the recommendation may indicate that the condensing unit 202 is disconnected from the power supply or that the power supply is defective.

At step 320, the thermostat 104 may determine a fault associated with the condensing unit 202 in response to determining that the sound sensor 106 received a second audio signal 112 from step 316. For example, the thermostat 104 may have determined that the motor 208 is operating based on the prior steps of process 300. The thermostat 104 may determine that the motor 208 is not operating in the first mode of operation or in the protection mode of operation due to one or more faults. The thermostat 104 may be configured to detect a fault when an audio signature 130 is not present within the audio signal 112 captured in step 304, when an audio signature 130 is present within the audio signal 112 captured in step 304, based on the presence or absence of specific frequencies within the audio signal 112 captured in step 304, or any combination thereof. The thermostat 104 may determine a fault by determining the fault type 132 (referring to FIG. 1) stored in the memory 118 associated with the audio signature 130 determined within the audio signal 112 from step 306. In embodiments, the fault type 132 may be associated with performance of the condensing unit 202 of the HVAC system 102. Examples of fault types 132 may include, but are not limited to, motor faults, motor mounting hardware faults, fan faults, or any other suitable type of fault associated with the condensing unit 202.

The thermostat 104 may then output a recommendation based on the determined fault. The thermostat 104 may output instructions in the recommendation for repairing the detected fault. After detecting a fault, the thermostat 104 may output information about the components of the condensing unit 202 that are associated with the fault and/or any other information that can be used to service the condensing unit 202. For example, the thermostat 104 may output service instructions for how to repair or replace the identified components, tools for servicing the identified components, and/or any other suitable type of information that is associated with the identified components of the condensing unit 202. Process 300 may then proceed to end.

Process 300 allows a user or technician to obtain information about the components that need to be serviced or replaced before the technician arrives to the space 110 (referring to FIG. 1). This feature reduces the downtime of the condensing unit 202 by providing diagnostic information to the technician before the technician arrives, which reduces the amount of time required to diagnose issues with the condensing unit 202 and to service the condensing unit 202.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A heating, ventilation, and air conditioning (HVAC) system, comprising:
   a cooling unit configured to receive an airflow and to transfer heat from the received airflow to a flow of refrigerant;
   a condensing unit configured to reject heat from the flow of refrigerant, the condensing unit comprising a fan and a motor;
   a sound sensor configured to capture an audio signal of the condensing unit; and
   an analysis device operably coupled to the sound sensor, comprising:
      a memory operable to store an audio signature library comprising a plurality of audio signatures, wherein:
         each audio signature identifies one or more attributes for a portion of an audio signal; and
         each audio signature is associated with one or more fault types for one or more of the motor, the fan, or mounting hardware of the condensing unit; and
      a processor operably coupled to the memory, configured to:
         determine that there is a demand to operate the fan within the condensing unit of the HVAC system;
         receive a first audio signal from the sound sensor associated with the condensing unit;
         determine an audio signature of the received first audio signal;
         determine that the motor is not in a first mode of operation based on the determined audio signature;
         determine whether a second audio signal is received from the sound sensor;
         in response to determining that the sound sensor received the second audio signal, determine the fault type based on the determination of the audio signature present within the first audio signal; and
         output a recommendation based on the determined fault type.

2. The HVAC system of claim 1, wherein the processor is further configured to:
   send a command to energize a component sharing a power supply with the motor of the condensing unit.

3. The HVAC system of claim 2, wherein the processor is further configured to:
   determine that power is not being supplied to the motor in response to determining that the sound sensor did not receive the second audio signal.

4. The HVAC system of claim 1, wherein the processor is further configured to:
   determine that the motor is in a protection mode of operation; and
   display an output that the motor is in the protection mode of operation.

5. The HVAC system of claim 1, wherein the processor is further configured to transition the sound sensor from an inactive state to an active state after sending a command to actuate the condensing unit, wherein:
   the sound sensor is not configured to capture the first audio signal while in the inactive state; and
   the sound sensor is configured to capture the first audio signal while in the active state.

6. The HVAC system of claim 1, wherein the processor is further configured to:
   generate a representation of the first audio signal; and
   compare the determined audio signature to the representation of the first audio signal.

7. The HVAC system of claim 1, wherein outputting the recommendation comprises transmitting a signal to a device that is located external to the HVAC system, wherein the recommendation comprises instructions for servicing the condensing unit.

8. A method of diagnosing a motor of a condensing unit, comprising:
   determining that there is a demand to operate a fan disposed within the condensing unit;
   receiving a first audio signal from a sound sensor associated with the condensing unit;
   determining an audio signature of the received first audio signal;
   determining that the motor is not in a first mode of operation based on the determined audio signature;
   determining whether a second audio signal is received from the sound sensor;
   in response to determining that the sound sensor received the second audio signal, determining a fault type based on the determination of the audio signature present within the first audio signal; and
   outputting a recommendation based on the determined fault type.

9. The method of claim 8, further comprising sending a command to energize a component sharing a power supply with the motor of the condensing unit.

10. The method of claim 9, further comprising determining that power is not being supplied to the motor in response to determining that the sound sensor did not receive the second audio signal.

11. The method of claim 8, further comprising:
   determining that the motor is in a protection mode of operation; and
   displaying an output that the motor is in the protection mode of operation.

12. The method of claim 8, further comprising:
   generating a representation of the first audio signal; and
   comparing the determined audio signature to the representation of the first audio signal.

13. The method of claim 8, wherein outputting the recommendation comprises transmitting a signal to a device that is located external to a heating, ventilation, and air conditioning (HVAC) system, wherein the recommendation comprises instructions for servicing the condensing unit.

14. An analysis device, comprising:
   a memory operable to store an audio signature library comprising a plurality of audio signatures, wherein:
      each audio signature identifies one or more attributes for a portion of an audio signal; and
      each audio signature is associated with one or more fault types for one or more of a motor, a fan, or mounting hardware associated with a condensing unit; and
   a processor operably coupled to the memory, configured to:
      determine that there is a demand to operate the fan disposed within the condensing unit;
      receive a first audio signal from a sound sensor associated with the condensing unit;
      determine an audio signature of the received first audio signal;

determine that the motor is not in a first mode of operation based on the determined audio signature;

determine whether a second audio signal is received from the sound sensor;

in response to determining that the sound sensor received the second audio signal, determine the fault type based on the determination of the audio signature present within the first audio signal; and output a recommendation based on the determined fault type.

15. The analysis device of claim 14, wherein the processor is further configured to:

send a command to energize a component sharing a power supply with the motor of the condensing unit.

16. The analysis device of claim 15, wherein the processor is further configured to:

determine that power is not being supplied to the motor in response to determining that the sound sensor did not receive the second audio signal.

17. The analysis device of claim 14, wherein the processor is further configured to:

determine that the motor is in a protection mode of operation; and display an output that the motor is in the protection mode of operation.

18. The analysis device of claim 14, wherein the processor is further configured to transition the sound sensor from an inactive state to an active state after sending a command to actuate the condensing unit, wherein:

the sound sensor is not configured to capture the first audio signal while in the inactive state; and the sound sensor is configured to capture the first audio signal while in the active state.

19. The analysis device of claim 14, wherein the processor is further configured to:

generate a representation of the first audio signal; and compare the determined audio signature to the representation of the first audio signal.

20. The analysis device of claim 14, wherein outputting the recommendation comprises transmitting a signal to a device that is located external to a heating, ventilation, and air conditioning (HVAC) system, wherein the recommendation comprises instructions for servicing the condensing unit.

* * * * *